(12) United States Patent
Cogen et al.

(10) Patent No.: US 6,262,157 B1
(45) Date of Patent: Jul. 17, 2001

(54) POLYETHYLENE CROSSLINKABLE COMPOSITION

(75) Inventors: Jeffrey Morris Cogen, Flemington; Laurence Herbert Gross, Bridgewater, both of NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/409,040

(22) Filed: Sep. 29, 1999

(51) Int. Cl.$^7$ ............... C08K 5/15; B32B 27/00
(52) U.S. Cl. ............... 524/110; 428/500
(58) Field of Search ............... 524/110; 428/500

(56) References Cited

U.S. PATENT DOCUMENTS 5,844,027 * 12/1998 Burdick et al. ............... 524/110

OTHER PUBLICATIONS

"Update on antioxidants and UV stabilizers", Marcie McMurrer, *Plastics Compounding*, Mar./Apr. 1991, pp 52–57.

"Vitamin E—A New Choice for Polyolefin Film Stabilization", A. Gupta, A. O'Driscoll and E. Kramer, Ciba Specialty Chemicals Corp., presented at Intl. Conf. on Additives for Polyolefins, Houston, Texas, Feb. 1998.

* cited by examiner

*Primary Examiner*—Kriellion Sanders

(57) ABSTRACT

A composition comprising:
(a) polyethylene;
(b) as a scorch inhibitor, alpha-tocopherol in an amount of at least about 0.08 part by weight per 100 parts by weight of polyethylene;
(c) optionally, a cure booster; and
(d) an organic peroxide.

10 Claims, No Drawings

POLYETHYLENE CROSSLINKABLE COMPOSITION

TECHNICAL FIELD

This invention relates to polyethylene compositions useful in the preparation of cable insulation, semiconducting shields, and jackets.

BACKGROUND OF THE INVENTION

A typical electric power cable generally comprises one or more conductors in a cable core that is surrounded by several layers of polymeric materials including a first semiconducting shield layer (conductor or strand shield), an insulating layer, a second semiconducting shield layer (insulation shield), a metallic tape or wire shield, and a protective jacket. Additional layers within this construction such as moisture impervious materials are often incorporated. Other cable constructions such as plenum and riser cable omit the shield.

In many cases, crosslinking of the polymeric materials is essential to the particular cable application, and, in order to accomplish this, useful compositions generally include a polymer; a crosslinking agent, usually an organic peroxide; and antioxidants, and, optionally, various other additives such as a scorch inhibitor or retardant and a crosslinking booster. Crosslinking assists the polymer in meeting mechanical and physical requirements such as improved high temperature properties.

The crosslinking of polymers with free radical initiators such as organic peroxides is well known. Generally, the organic peroxide is incorporated into the polymer by melt blending in a roll mill, a biaxial screw kneading extruder, or a Banbury™ or Brabender™ mixer at a temperature lower than the onset temperature for significant decomposition of the peroxide. Peroxides are judged for decomposition based on their half life temperatures as described in Plastic Additives Handbook, Gachter et al, 1985, pages 646 to 649. An alternative method for organic peroxide incorporation into a polymeric compound is to mix liquid peroxide and pellets of the polymer in a blending device, such as a Henschel™ mixer or a soaking device such as a simple drum tumbler, which are maintained at temperatures above the freeze point of the organic peroxide and below the decomposition temperature of the organic peroxide and the melt temperature of the polymer. Following the organic peroxide incorporation, the polymer/organic peroxide blend is then, for example, introduced into an extruder where it is extruded around an electrical conductor at a temperature lower than the decomposition temperature of the organic peroxide to form a cable. The cable is then exposed to higher temperatures at which the organic peroxide decomposes to provide free radicals, which crosslink the polymer.

Polymers containing peroxides are vulnerable to scorch (premature crosslinking occurring during the extrusion process). Scorch causes the formation of discolored gel-like particles in the resin and leads to undesired build up of extruder pressure during extrusion. Further, to achieve a high crosslink density, high levels of organic peroxide have been used. This leads to a problem known as sweat-out, which has a negative effect on the extrusion process and the cable product. Sweat-out dust is an explosion hazard, may foul filters, and can cause slippage and instability in the extrusion process. The cable product produced using material with sweat-out may have surface irregularities such as lumps and pimples and voids may form in the insulation layer.

Industry is constantly seeking to find polyethylene crosslinkable compositions, which can be extruded at high temperatures (although limited by the decomposition temperature of the organic peroxide) and rates with a minimum of scorch and yet be crosslinked at a fast cure rate to a high crosslink density.

DISCLOSURE OF THE INVENTION

An object of this invention, therefore, is to provide a polyethylene composition with a scorch inhibitor, which minimizes scorch and maximizes crosslink density. Other objects and advantages will become apparent hereinafter.

According to the invention, such a composition has been discovered. The composition comprises:

(a) polyethylene;
(b) as a scorch inhibitor, alpha-tocopherol (Vitamin E) in an amount of at least about 0.08 part by weight per 100 parts by weight of polyethylene;
(c) optionally, a cure booster; and
(d) an organic peroxide.

DESCRIPTION OF THE PREFERRED EMBODIMENT(S)

Polyethylene, as that term is used herein, is a homopolymer of ethylene or a copolymer of ethylene and a minor proportion of one or more alpha-olefins having 3 to 12 carbon atoms, and preferably 4 to 8 carbon atoms, and, optionally, a diene, or a mixture or blend of such homopolymers and copolymers. The mixture can be a mechanical blend or an in situ blend. Examples of the alpha-olefins are propylene, 1-butene, 1-hexene, 4-methyl-1-pentene, and 1-octene. The polyethylene can also be a copolymer of ethylene and an unsaturated ester such as a vinyl ester, e.g., vinyl acetate or an acrylic or methacrylic acid ester.

The polyethylene can be homogeneous or heterogeneous. The homogeneous polyethylenes usually have a polydispersity (Mw/Mn) in the range of about 1.5 to about 3.5 and an essentially uniform comonomer distribution, and are characterized by single and relatively low DSC melting points. The heterogeneous polyethylenes, on the other hand, have a polydispersity (Mw/Mn) greater than 3.5 and do not have a uniform comonomer distribution. Mw is defined as weight average molecular weight and Mn is defined as number average molecular weight. The polyethylenes can have a density in the range of 0.860 to 0.950 gram per cubic centimeter, and preferably have a density in the range of 0.870 to about 0.930 gram per cubic centimeter. They also can have a melt index in the range of about 0.1 to about 50 grams per 10 minutes.

The polyethylenes can be produced by low or high pressure processes. They can be produced in the gas phase or in the liquid phase in solutions or slurries by conventional techniques. Low pressure processes are typically run at pressures below 1000 psi whereas high pressure processes are typically run at pressures above 15,000 psi.

Typical catalyst systems, which can be used to prepare these polyethylenes, are magnesium/titanium based catalyst systems, which can be exemplified by the catalyst system described in U.S. Pat. No. 4,302,565 (heterogeneous polyethylenes); vanadium based catalyst systems such as those described in U.S. Pat. Nos. 4,508,842 (heterogeneous polyethylenes) and U.S. Pat. Nos. 5,332,793; 5,342,907; and 5,410,003 (homogeneous polyethylenes); a chromium based catalyst system such as that described in U.S. Pat. No. 4,101,445; a metallocene catalyst system such as those described in U.S. Pat. Nos. 4,937,299, 5,272,236, 5,278,272, and 5,317,036 (homogeneous polyethylenes); or other transition metal catalyst systems. Many of these catalyst systems are often referred to as Ziegler-Natta catalyst systems or Phillips catalyst systems. Catalyst systems, which use chromium or molybdenum oxides on silica-alumina supports, can be included here. Typical processes for preparing the polyethylenes are also described in the aforementioned patents. Typical in situ polyethylene blends and processes and catalyst systems for providing same are described in U.S. Pat. Nos. 5,371,145 and 5,405,901. The various polyethylenes can include low density homopolymers of ethylene made by high pressure processes (HP-LDPEs), linear low density polyethylenes (LLDPEs), very low density polyethylenes (VLDPEs), medium density polyethylenes (MDPEs), high density polyethylene (HDPE) having a density greater than 0.940 gram per cubic centimeter and metallocene copolymers with densities less than 0.900 gram per cubic centimeter. The latter five polyethylenes are generally made by low pressure processes. A conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of about 10,000 to 30,000 psi and the temperature is in the range of about 175 to about 250° C., and in the tubular reactor, the pressure is in the range of about 25,000 to about 45,000 psi and the temperature is in the range of about 200 to about 350° C. Blends of high pressure polyethylene and metallocene resins are particularly suited for use in the application, the former component for its excellent processability and the latter for its flexibility.

Copolymers comprised of ethylene and unsaturated esters are well known, and can be prepared by the conventional high pressure techniques described above. The unsaturated esters can be alkyl acrylates, alkyl methacrylates, and vinyl carboxylates. The alkyl group can have 1 to 8 carbon atoms and preferably has 1 to 4 carbon atoms. The carboxylate group can have 2 to 8 carbon atoms and preferably has 2 to 5 carbon atoms. The portion of the copolymer attributed to the ester comonomer can be in the range of about 5 to about 50 percent by weight based on the weight of the copolymer, and is preferably in the range of about 15 to about 40 percent by weight. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. The melt index of the ethylene/unsaturated ester copolymers can be in the range of about 0.5 to about 50 grams per 10 minutes, and is preferably in the range of about 2 to about 25 grams per 10 minutes. One process for the preparation of a copolymer of ethylene and an unsaturated ester is described in U.S. Pat. No. 3,334,081.

The VLDPE can be a copolymer of ethylene and one or more alpha-olefins having 3 to 12 carbon atoms and preferably 3 to 8 carbon atoms. The density of the VLDPE can be in the range of 0.870 to 0.915 gram per cubic centimeter. It can be produced, for example, in the presence of (i) a catalyst containing chromium and titanium, (ii) a catalyst containing magnesium, titanium, a halogen, and an electron donor; or (iii) a catalyst containing vanadium, an electron donor, an alkyl aluminum halide modifier, and a halocarbon promoter. Catalysts and processes for making the VLDPE are described, respectively, in U.S. Pat. Nos. 4,101,445; 4,302,565; and 4,508,842. The melt index of the VLDPE can be in the range of about 0.1 to about 20 grams per 10 minutes and is preferably in the range of about 0.3 to about 5 grams per 10 minutes. The portion of the VLDPE attributed to the comonomer(s), other than ethylene, can be in the range of about 1 to about 49 percent by weight based on the weight of the copolymer and is preferably in the range of about 15 to about 40 percent by weight. A third comonomer can be included, e.g., another alpha-olefin or a diene such as ethylidene norbornene, butadiene, 1,4-hexadiene, or a dicyclopentadiene. Ethylene/propylene copolymers and ethylene/propylene/diene terpolymers are generally referred to as EPRs and EPDMs, respectively. The third comonomer can be present in an amount of about 1 to 15 percent by weight based on the weight of the copolymer and is preferably present in an amount of about 1 to about 10 percent by weight. It is preferred that the copolymer contain two or three comonomers inclusive of ethylene.

The LLDPE can include the VLDPE and MDPE, which are also linear, but, generally, has a density in the range of 0.916 to 0.925 gram per cubic centimeter. It can be a copolymer of ethylene and one or more alpha-olefins having 3 to 12 carbon atoms, and preferably 3 to 8 carbon atoms. The melt index can be in the range of about 1 to about 20 grams per 10 minutes, and is preferably in the range of about 1 to about 8 grams per 10 minutes. The alpha-olefins can be the same as those mentioned above, and the catalysts and processes are also the same subject to variations necessary to obtain the desired densities and melt indices.

As noted, included in the definition of polyethylene are homopolymers of ethylene made by a conventional high pressure process. The homopolymer preferably has a density in the range of 0.910 to 0.930 gram per cubic centimeter. The homopolymer can also have a melt index in the range of about 0.75 to about 5 grams per 10 minutes, and preferably has a melt index in the range of about 0.75 to about 3 grams per 10 minutes. Melt index is determined under ASTM D-1238, Condition E. It is measured at 190° C. and 2160 grams.

The scorch inhibitor is alpha-tocopherol (Vitamin E).

The optional cure (crosslinking) booster can be any one, or a mixture, of a broad selection of boosters. For example, it can be an ester, ether, ketone, cyanurate, isocyanurate, phosphate, ortho formate, aliphatic or aromatic ether containing at least 1, and preferably 3, unsaturated groups such as allyl, vinyl, or acrylate. The number of carbon atoms in the cure booster can be in the range of 9 to 40 or more, and is preferably 9 to 20. Specific examples are triallyl cyanurate (TAC); triallyl-1,3,5-triazine-2,4,6(1H,3H,5H)-trione also known as triallyl isocyanurate (TAIC); triallyl phosphate; triallyl ortho formate; tetra-allyloxy-ethane; triallyl benzene-1,3,5-tricarboxylate; diallyl pthalate; zinc dimethacrylate; ethoxylated bisphenol A dimethacrylate; methacrylate terminated monomer with average chain length of $C_{14}$ or $C_{15}$; pentaerythritol tetraacrylate; dipentaerythritol pentaacrylate; pentaerythritol triacrylate; dimethylolpropane tetraacrylate; ethoxylated trimethylolpropane triacrylate; trimethylolpropane triacrylate; 2,4,6-triallyl-1,3,5-trione; 2,4-diphenyl-4-methyl-1-pentene; triallyl trimellitate (TATM); 3,9-divinyl-2,4,8,10-tetraoxaspiro[5.5] undecane (DVS); triallylcyanurate; and triallyl isocyanurate. Also see U.S. Pat. No. 4,018,852.

The organic peroxide preferably has a decomposition temperature of 100 to 220° C. for a half-life of 10 minutes and can be exemplified by the following compounds [the numbers set off by the parentheses are their decomposition temperatures (in ° C.)]: succinic acid peroxide (110), benzoyl peroxide (110), t-butyl peroxy-2-ethyl hexanoate (113), p-chlorobenzoyl peroxide (115), t-butyl peroxy isobutylate (115), t-butyl peroxy isopropyl carbonate (135), t-butyl peroxy laurate (140), 2,5-dimethyl-2,5-di(benzoyl peroxy) hexane (140), t-butyl peroxy acetate (140), di-t-butyl diperoxy phthalate (140), t-butyl peroxy maleic acid (140), cyclohexanone peroxide (145), t-butyl peroxy benzoate (145), dicumyl peroxide (150), 2,5-dimethyl-2,5-di(t-butylperoxy)hexane (155), t-butyl cumyl peroxide (155), t-butyl hydroperoxide (158), di-t-butyl peroxide (160), 2,5-dimethyl-2,5-di(t-butyl peroxy)hexane-3 (170), and alpha, alpha'-bis-t-butylperoxy-1,4-diisopropylbenzene (160).

Based on 100 parts by weight of polyethylene, the proportions of the compounds can be about as follows (in parts by weight):

| Component | Broad Range | Preferred Range |
| --- | --- | --- |
| (b) scorch inhibitor | 0.08 to 0.5 | 0.1 to 0.3 |
| (c) cure booster (optional) | 0.1 to 1 | 0.25 to 0.75 |
| (d) organic peroxide | 0.4 to 3 | 0.6 to 1.8 |

It should be understood that these proportions can vary outside of the stated ranges depending on the desired properties.

The composition of the invention can be processed in various types of extruders, e.g., single or twin screw types. A description of a conventional extruder can be found in U.S. Pat. No. 4,857,600. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. For the purposes of this specification, it will be understood that the term "extruder" includes, in addition to conventional extruders, the combination of an extruder, crosshead, die, and a heating or cooling zone where a further forming of the material can be accomplished. The heating or cooling follows the die and may be, for example, an oven. In wire coating, where the material is crosslinked after extrusion, the die of the crosshead feeds directly into a heating zone, and this zone can be maintained at a temperature in the range of about 120 to about 260° C., and preferably in the range of about 170 to about 220° C.

The extrudate is then crosslinked by exposing it to a temperature greater than the decomposition temperature of the organic peroxide. Preferably, the peroxide employed is decomposed through four or more half-lives. The crosslinking can be accomplished in, for example, an oven or a continuous vulcanizable (CV) tube. With steam CV equipment, a pressure rated vulcanizing tube is mechanically coupled to the extruder crosshead such that the polymer melt exits the crosshead/die assembly into a vulcanizing pipe running perpendicular to the extruder. In a typical CV operation, compositions incorporating peroxides are extrusion fabricated into insulation and cable jacketing at low melt extrusion temperatures to avoid premature crosslinking in the extruder. The fabricated melt shape exits the shaping die into the steam vulcanizing tube where post extrusion peroxide initiated crosslinking occurs. The steam tube is filled with saturated steam which continues to heat the polyolefin melt to the increased temperatures needed for crosslinking. Most of the CV tube is filled with saturated steam to maximize dwell time for crosslinking to occur. The final length before exiting the tube is filled with water to cool the now crosslinked insulation/jacketing. At the end of the CV tube, the insulated wire or cable passes through an end seal incorporating close fitting gaskets, which minimize the cooling water leakage. Steam regulators, water pumps, and valvings maintain equilibrium of the steam and water and the respective fill lengths within the steam CV tube. Alternatively, a hot nitrogen gas CV tube may be used to cure the cable construction.

Conventional additives can be added to the polymer either before or during processing. The amount of additive is usually in the range of about 0.01 to about 50 percent by weight based on the weight of the resin, the higher percentages generally relating to fillers and fire retardants. Useful additives are antioxidants, ultraviolet absorbers, antistatic agents, pigments, carbon black, dyes, fillers, slip agents, fire retardants, plasticizers, processing aids, lubricants, stabilizers, smoke inhibitors, halogen scavengers, flow aids, lubricants, water tree inhibitors such as polyethylene glycol, and viscosity control agents. In certain cases it may also be desirable to add one or more auxilliary scorch inhibitors (in addition to the alpha-tocopherol).

In order to provide a semiconducting shield it is necessary to incorporate conductive particles into the composition. These conductive particles are generally provided by particulate carbon black. Useful carbon blacks can have a surface area of about 50 to about 1000 square meters per gram. The surface area is determined under ASTM D 4820-93a (Multipoint B.E.T. Nitrogen Adsorption). The carbon black is used in the semiconducting shield composition in an amount of about 20 to about 60 percent by weight based on the weight of the composition, and is preferably used in an amount of about 25 to about 45 percent by weight. Examples of conductive carbon blacks are the grades described by ASTM N550, N472, N351, and N110, and acetylene black. Examples of semiconducting compositions are contained in U.S. Pat. Nos. 4,286,023, 4,612,139, and 5,556,697.

Examples of antioxidants are: hindered phenols such as tetrakis [methylene (3,5-di-tert-butyl-4-hydroxyhydrocinnamate)]methane, bis[(beta-(3,5-ditert-butyl-4-hydroxybenzyl)-methylcarboxyethyl)]sulphide, and thiodiethylene bis(3,5-di-tert-butyl-4-hydroxy hydrocinnamate); phosphites and phosphonites such as tris(2,4-di-tert-butylphenyl) phosphite and di-tert-butylphenyl-phosphonite; thio compounds such as dilaurylthiodipropionate, dimyristylthiodipropionate, distearylthiodipropionate (DSTDP), and pentaerythritol tetrakis (B-laurylthiopropionate); various siloxanes; and various amines such as polymerized 2,2,4-trimethyl-1,2-dihydroquinoline, 4,4'-bis(alpha, alpha-dimethylbenzyl) diphenylamine, alkylated diphenylamines, and hindered amine light stabilizers. Antioxidants can be used in amounts of about 0.1 to about 5 percent by weight based on the weight of the composition. Generally, lower amounts can be used because the scorch inhibitor, which is in the composition of the invention, is an excellent process and heat stabilizer.

Advantages of the invention are low scorch, higher useful extrusion temperatures, longer extrusion run times, high crosslink density, less degradation during aging, less propensity for sweat out resulting from higher peroxide levels, and, under suitable conditions, higher throughput of wire or cable through the continuous vulcanizing oven. A key advantage is the relatively good compatibility of the scorch inhibitor with the resin and its liquid form resulting in extrusion melt blending with no contaminating crystals in the product. The scorch inhibitor, in this case, also provides oxidative stability. The high level of scorch resistance is unexpected.

At least three methods exist for quantifying the degree of crosslinking of the resin: (i) by "hot-set"(IEC 502/540). This is accomplished by attaching a weight to the crosslinked composition in plaque form at 200° C. If the elongation is less than 150 percent, the crosslink density is sufficient for industrial purposes. (ii) by decalin extractables (ASTM D 2765). The uncrosslinked polymer dissolves in the hot decalin solvent and the value is reported in percent by weight decalin extractables. A value below 30 percent and preferably less than 20 percent is judged to be acceptable. (iii) by rheometer, which checks the viscosity. The rheometer test procedure is described in U.S. Pat. No. 3,954,907. The first two methods are industry standards. The third method is a diagnostic tool particularly suitable for accurate screening and laboratory study.

The higher the extrusion temperature, the hotter the resin composition going into the CV tube to be crosslinked and, thus, the faster the cure rate, simply because the resin composition doesn't have to be heated up as much for the cure step. Additionally, provided that there is not a significant amount of scorching, a higher extrusion temperature results in greater throughput of polymer per unit time, leading to higher manufacturing productivity. Thus, all other things being equal, a scorch retardant composition enables higher extrusion temperatures and higher manufacturing productivity.

The term "surrounded" as it applies to a substrate being surrounded by an insulating composition, jacketing material, or other cable layer is considered to include extruding around the substrate; coating the substrate; or wrapping around the substrate as is well known by those skilled in the art. The substrate can include, for example, a core including a conductor or a bundle of conductors, or various underlying cable layers as noted above.

The patents, patent applications, and publications mentioned in this specification are incorporated by reference herein.

The invention is illustrated by the following examples.

EXAMPLES 1 to 8

100 parts by weight of the ethylene polymer are fluxed in a Brabender™ mixer heated to approximately 127° C. The additives, i.e., the scorch inhibitor and antioxidants are added to the fluxed resin and mixed at approximately 127° C. for 3 minutes. The peroxide is then added, and mixing is continued for an additional 3 minutes at approximately 127° C. The molten compound is then removed from the mixer and quickly transferred to platens and flattened on a hydraulic press (without additional heating) at 2500 to 3000 psi to form a plaque approximately one eighth of an inch thick. The resulting plaque is then cut into eighth inch strips and fed into a Berlyn™ pelletizer to produce cube-shaped pellets of about one eighth inch per side. This procedure is convenient for laboratory scale experiments. As discussed previously, other processes and temperatures can be used to produce the compositions of the invention. Variables and results are set forth in Table I. The additives are set forth in percent by weight based on the weight of the total composition.

Example 1 contains additives known to be used in power cable insulation. Examples 2 through 6 contain alpha-tocopherol at various levels in addition to the additives of example 1. Examples 7 and 8 contain a commonly used antioxidant in place of, and in the same amounts as, the alpha-tocopherol of examples 2 and 3.

TABLE 1

| Examples | 1 | 2 | 3 | 4 | 5 | 6 | 7 | 8 |
|---|---|---|---|---|---|---|---|---|
| Components (weight percent): | | | | | | | | |
| copolymer | 97.10 | 96.75 | 96.90 | 96.95 | 97.00 | 97.05 | 96.90 | 96.75 |
| peroxide | 1.20 | 1.20 | 1.20 | 1.20 | 1.20 | 1.20 | 1.20 | 1.20 |
| triallylcyanurate | 0.40 | 0.40 | 0.40 | 0.40 | 0.40 | 0.40 | 0.40 | 0.40 |
| PEG | 0.60 | 0.60 | 0.60 | 0.60 | 0.60 | 0.60 | 0.60 | 0.60 |
| A/O I | 0.35 | 0.35 | 0.35 | 0.35 | 0.35 | 0.35 | 0.35 | 0.35 |
| A/O II | — | — | — | — | — | — | 0.20 | 0.35 |
| DSTDP | 0.35 | 0.35 | 0.35 | 0.35 | 0.35 | 0.35 | 0.35 | 0.35 |
| alpha-tocopherol | — | 0.35 | 0.20 | 0.15 | 0.10 | 0.05 | — | — |
| Results: | | | | | | | | |
| Scorch Time at 155° C. (minutes) | 7 | 25 | 16 | 12 | 10 | 8 | 7 | 8 |
| Efficiency (182° C.) | 1.3 | 3.7 | 2.1 | 1.9 | 1.6 | 1.4 | 1.4 | 1.3 |

Notes to Table:
1. copolymer = a copolymer of ethylene and 1-butene having a density of 0.90 gram per cubic centimeter and a melt index of 0.50 decigrams per minute.
2. peroxide = alpha, alpha'-bis-t-butylperoxy-1,4-diisopropylbenzene.
3. PEG = polyethylene glycol having a molecular weight of 20,000.
4. A/O I = as an antioxidant, thiodiethylene bis(3,5-di-tert-butyl-4-hydroxy hydrocinnamate).
5. A/O II = as an antioxidant, tetrakis[methylene(3,5-di-tert-butyl-4-hydroxyhydro-cinnamate)]methane.
6. DSTDP = as an antioxidant, distearylthiodipropionate
7. Scorch Time at 155° C. = the time, in minutes, that it takes the insulation to reach a value of 1 inch-pound of torque over the minimum torque on the MDR (a moving die rheometer manufactured by Alpha Technologies and operated using a 0.5 degree rotation arc and the specified temperature). A higher number is better, since it is indicative of the resistance to premature crosslinking (scorch) near the processing temperature. The embodiments of the invention in examples 2 through 5 have significantly higher scorch times than the formulations based on prior art stabilizers.
8. Efficiency = a parameter, measured at 182° C., as described in U.S. Pat. No. 4,018,852. It attempts to take into account both the scorch resistance of a formulation as well as the cure characteristics (cure speed and degree of crosslinking). A higher value indicates an excellent combination of scorch resistance and cure characteristics. The embodiments of the invention in examples 2 through 5, with efficiencies of 3.7 to 1.6, are advantageous relative to the values of 1.3 and 1.4 obtained in examples 1, 6, 7, and 8.

What is claimed is:
1. A composition comprising:
 (a) polyethylene;
 (b) as a scorch inhibitor, alpha-tocopherol in an amount in the range of 0.08 to 0.5 part by weight per 100 parts by weight of polyethylene;
 (c) optionally, a cure booster; and
 (d) an organic peroxide.
2. The composition defined in claim 1 wherein the scorch inhibitor is present in an amount of about 0.1 to about 0.5 part by weight based on 100 parts by weight of polyethylene.

3. The composition defined in claim 1 wherein the cure booster is present in an amount of about 0.1 to about 1 part by weight based on 100 parts by weight of polyethylene.

4. The composition defined in claim 1 wherein the organic peroxide is present in an amount of about 0.4 to about 3 parts by weight based on 100 parts by weight of polyethylene.

5. The composition defined in claim 1 wherein the weight ratio of scorch inhibitor to cure booster, if used, is in the range of about 0.03:1 to about 5:1.

6. The composition defined in claim 1 wherein, for each 100 parts by weight of polyethylene, the other components are present as follows:
   (b) about 0.1 to about 0.3 part by weight of scorch inhibitor;
   (c) about 0.25 to about 0.75 part by weight of cure booster; and
   (d) about 0.4 to about 3 parts by weight of organic peroxide.

7. The composition defined in claim 6 wherein the cure booster is triallyl trimellitate; 3,9-divinyl-2,4,8,10-tetraoxaspiro[5.5]undecane; triallylcyanurate; or triallyl isocyanurate.

8. A cable comprising one or more electrical conductors or a core of electrical conductors, each conductor or core being surrounded by a composition comprising:
   (a) a crosslinked polyethylene;
   (b) as a scorch inhibitor, alpha-tocopherol in an amount in the range of 0.08 to about 0.5 part by weight per 100 parts by weight of polyethylene; and
   (c) optionally, a cure booster.

9. The cable defined in claim 8 wherein, for each 100 parts by weight of polyethylene, there are about 0.1 to 0.5 part by weight of component (b) and about 0.1 to about 1 part by weight of component (c).

10. A process for extrusion comprising extruding around one or more electrical conductors or a core of electrical conductors, at a temperature below the decomposition temperature of the organic peroxide, a composition comprising
   (a) polyethylene;
   (b) as a scorch inhibitor, alpha-tocopherol in an amount in the range of 0.08 to about 0.5 part by weight per 100 parts by weight of polyethylene;
   (c) optionally, a cure booster; and
   (d) an organic peroxide, and curing the extrudate.

* * * * *